United States Patent [19]

Colford

[11] Patent Number: 4,543,075
[45] Date of Patent: Sep. 24, 1985

[54] FLEXIBLE COUPLINGS

[75] Inventor: Terence H. Colford, Leicester, England

[73] Assignee: Dunlop Limited, London, England

[21] Appl. No.: 608,530

[22] Filed: May 9, 1984

Related U.S. Application Data

[63] Continuation of Ser. No. 362,992, Mar. 29, 1982, abandoned.

[30] Foreign Application Priority Data

Apr. 10, 1981 [GB] United Kingdom ............. 81 11332

[51] Int. Cl.$^4$ .............................................. F16D 3/68
[52] U.S. Cl. ......................................... 464/76; 464/85
[58] Field of Search ...................... 464/73, 74, 76, 81, 464/83, 85, 89

[56] References Cited

U.S. PATENT DOCUMENTS

| | | | |
|---|---|---|---|
| 1,548,629 | 8/1925 | Pfander | 464/76 |
| 1,611,558 | 12/1926 | Reed | 464/81 X |
| 1,671,436 | 5/1928 | Melott | 464/76 |
| 2,025,827 | 12/1935 | Ricefield | 464/76 |
| 2,034,001 | 3/1936 | Ricefield | 464/73 |
| 2,105,702 | 1/1938 | Scholtze | 464/73 |
| 2,127,942 | 8/1938 | Schmidt | 464/73 |
| 2,337,287 | 12/1943 | Williams | 464/83 X |
| 3,120,745 | 2/1964 | Saurer | 464/76 |
| 3,485,062 | 12/1969 | Blake | 464/73 |
| 3,545,585 | 12/1970 | Eaton, Jr. | 464/73 X |
| 4,050,266 | 9/1977 | Bergman | 464/76 |

FOREIGN PATENT DOCUMENTS

| | | | |
|---|---|---|---|
| 188987 | 3/1957 | Austria | 464/74 |
| 2253041 | 5/1974 | Fed. Rep. of Germany | 464/76 |
| 2534135 | 3/1976 | Fed. Rep. of Germany | 464/85 |
| 865265 | 5/1941 | France | 464/76 |

Primary Examiner—Stuart S. Levy
Assistant Examiner—Daniel P. Stodola
Attorney, Agent, or Firm—Stevens, Davis, Miller & Mosher

[57] ABSTRACT

A flexible coupling for transmitting torque between two relatively rotatable components comprises a plurality of connector members and resilient elements arranged alternately to form a ring in which alternate connector members are adapted for connection to a respective one of the components and each resilient element is disposed between confronting load transmitting surfaces which are inclined relative to the rotational axis of the coupling whereby axial loads are accommodated by the elements in compression and shear. An even number of members is provided for connection to each component and successive members which in use are connected to the same component are reversed so that under torque loads there is no net axial component of force acting on the members associated with a component.

11 Claims, 12 Drawing Figures

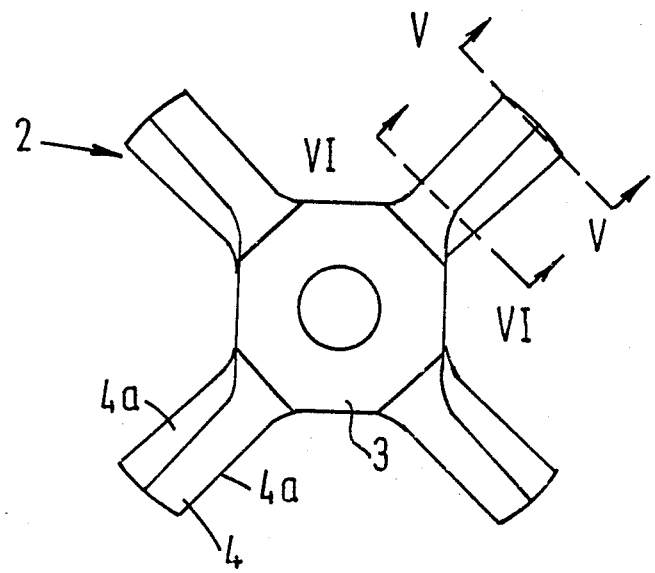
FIG. 4.
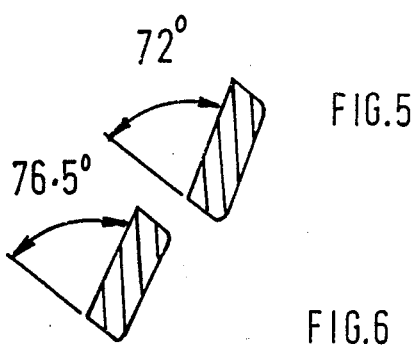
FIG. 5
FIG. 6

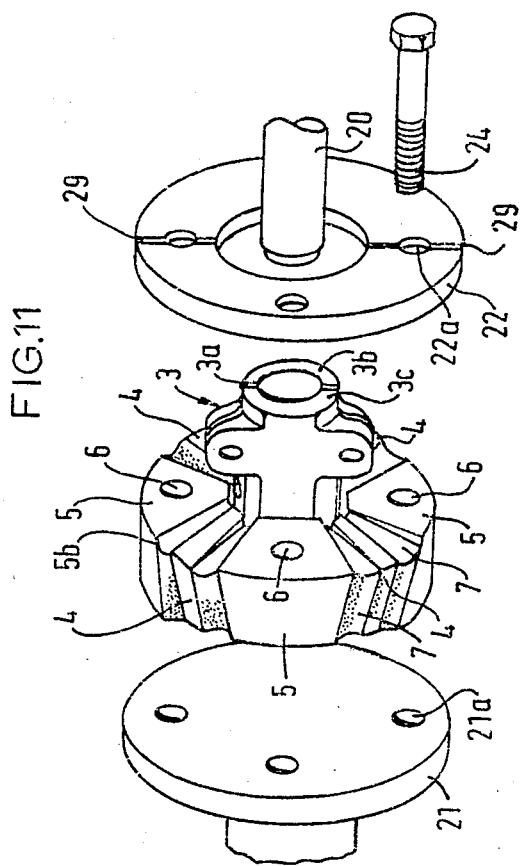

FLEXIBLE COUPLINGS

This application is a continuation of application Ser. No. 362,992, filed Mar. 29, 1982, now abandoned.

This invention concerns improvements in or relating to flexible couplings and in particular, though not exclusively, to flexible couplings for transmitting torque between two relatively rotatable components, for example driving and driven shafts.

Flexible couplings for transmitting torque between two relatively rotatable components are known comprising a plurality of rigid connector members and a plurality of resilient elastomeric elements arranged alternately to form a ring in which the connector members are adapted to be connected alternately to a respective one of the components and the load transmitting surfaces of each connector member extend parallel to the axis of rotation of the coupling whereby the elastomeric elements are loaded in compression under torque loads and in shear under axial loads.

The compression stiffness of the elastomeric elements is considerably greater than the shear stiffness thereof and in order to increase the axial load capacity it is known to angle the load transmitting surfaces of each connector member equally and oppositely relative to the axis of rotation of the coupling and to reverse successive connector members whereby the elastomeric elements are loaded in compression and shear under axial loads.

A disadvantage of this construction however is that under torque loads the connector memmbers connected to one of the components are subjected to a net axial component of force in one direction and the connector members connected to the other of the components are subjected to a net axial component of force in the opposite direction whereby there is a tendency for the connector members connected to the components to move towards or away from one another.

The invention as claimed is intended to remedy this disadvantage. It solves the problem of designing a coupling in which the load transmitting surfaces of the connector members are angled relative to the axis of rotation of the coupling so that axial loads are accommodated by the elastomeric elements in shear and compression without generating a net axial component of force acting on the connector members associated with each rotatable component under torque loads by providing an even number of connector members for attachment to each rotatable component and reversing successive connector members associated with each rotatable component.

The main advantage offered by the invention is that torque loads do not give rise to axial forces tending to urge the connector members associated with each rotatable component towards or away from one another while maintaining the benefit of higher axial load capacity obtained by the angling of the load transmitting surfaces relative to the rotational axis of the coupling.

Preferably there are at least four connector members adapted for connection to each rotatable component.

Preferably each of the connector members adapted for connection to one of the rotatable components has load transmitting surfaces oppositely inclined, preferably at equal and opposite angles, relative to the axis of rotation of the coupling i.e. relatively divergent and each of the intervening connector members adapted for connection to the other rotatable component has load transmitting surfaces inclined at equal angles relative to the axis of rotation of the coupling i.e. parallel.

Preferably the connector members adapted for connection to one of the rotatable components are separate and provided with respective means for attachment of the member to the component for example each connector member may comprise a sleeve having an axially extending through bore for the passage of a bolt or similar fastening means and the connector members adapted for connection to the other rotatable component are interconnected and provided with common means for attachment of the members to the component for example each connector member may comprise a blade integral with a central hub adapted for connection to the component.

Preferably each sleeve has relatively divergent load transmitting surfaces and each blade has parallel load transmitting surfaces. The load transmitting surfaces of each sleeve or blade may be planar or curved for example each blade may be of helical configuration such that the angle of inclination of the load transmitting surfaces relative to the axis of rotation increases with increase in the radial dimension of the blade although the surfaces remain parallel to one another.

Preferably the resilient elements are precompressed to load the elements in compression to reduce or eliminate the occurrence of tensile forces therein in use. Precompression may be effected during manufacture or on assembly.

In one preferred construction there are four blades extending radially outwards from a central hub and four intervening wedge-shaped sleeves arranged such that in the unassembled condition one pair of opposed sleeves is axially offset to one side of the blades and the other pair of opposed sleeves is axially offset by a similar amount to the other side of the blades. In consequence the elastomeric material between successive blades and sleeves is preloaded in compression on assembly by reducing the axial offset between the sleeves and the blades. Preferably each sleeve has an axially extending integral spacer portion to control the reduction in axial offset and hence the degree of precompression on assembly of the coupling. Preferably each blade has a pair of resilient stops, one at each axial end thereof, to control axial movement between the blades and sleeves beyond a predetermined value.

The invention will now be described in more detail, by way of example only, with reference to the accompanying drawings wherein:

FIG. 4 is an end view of the spider of the coupling shown in FIG. 1;

FIGS. 5 and 6 are sections on the lines V—V and VI—VI respectively of FIG. 4;

FIG. 11 is an exploded perspective view of the installation shown in FIGS. 9 and 10.

Figure 1:
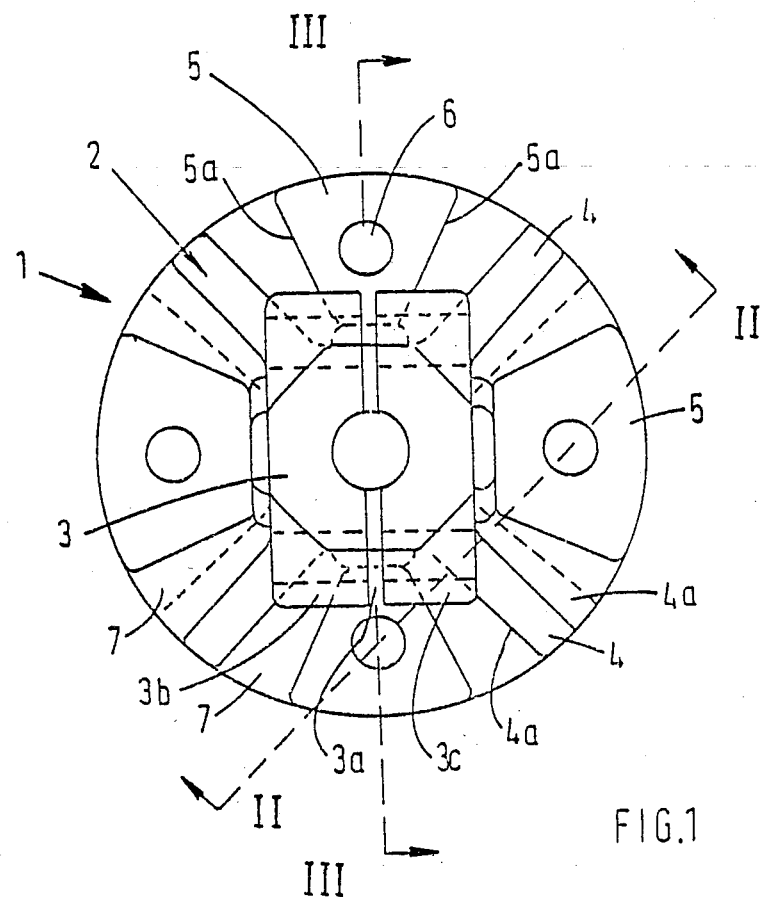
FIG. 1 is an end view of a coupling according to the present invention.

The coupling 1 shown in FIGS. 1 to 8 of the accompanying drawings includes a spider 2 having a central hub 3 for securing the spider to one of two relatively rotatable components (not shown) and four circumferentially spaced radially and axially extending blades 4 each having a pair of load transmitting surfaces 4a. Alternating with the blades 4 are four rigid connector sleeves 5 each having an axially extending bore 6 for securing the sleeve e.g. by means of a bolt (not shown) to the other of said two relatively rotatable components (not shown) and a pair of load transmitting surfaces 5a. Extended between and bonded to each pair of confronting circumferentially facing load transmitting surfaces 4a and 5a of a blade 4 and sleeve 5 respectively is a respective resilient rubber element 7.

Figure 7:
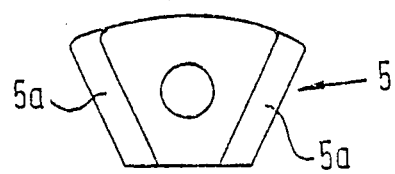
FIG. 7 is an end view of one of the connector sleeves of the coupling shown in FIG. 1.
Figure 2:
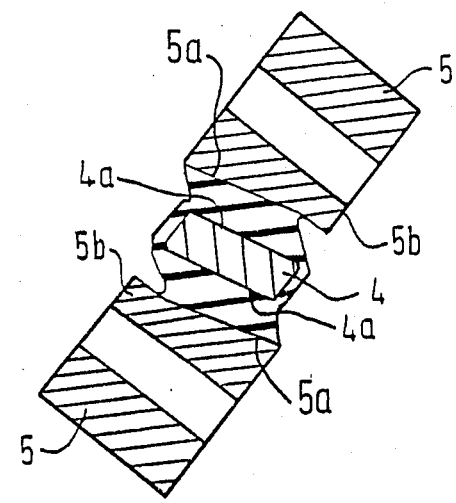
FIGS. 2 and 3 are sections on the lines II—II and III—III respectively of FIG. 1.
Figure 3:
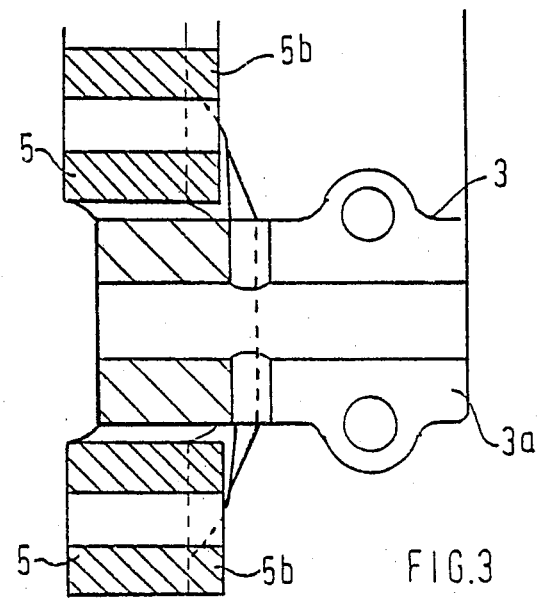

Each sleeve 5 is wedge-shaped in transverse cross-section and the associated load transmitting surfaces 5a are inclined at equal and opposite angles relative to the rotational axis of the coupling i.e. the surfaces 5a are relatively divergent in the axial direction from one end of the sleeve towards the other end (FIG. 7). Each sleeve 5 is formed at the narrower end thereof with an integral axially extending spacer portion 5b and successive sleeves 5 are reversed so that the associated circumferentially facing surfaces 5a are relatively divergent towards opposite end faces of the coupling (FIGS. 2, 3 and 8).

Each blade 4 is of helical configuration and the associated load transmitting surfaces 4a are inclined at equal angles relative to the rotational axis of the coupling i.e. the surfaces are parallel. As shown in FIGS. 5 and 6 the angle of inclination of the surfaces 4a is not constant in the radial direction of the blade but, due to the helical profile of the blade, increases relative to the rotational axis of the coupling with increase in the radial dimension of the blade although the surfaces 4a are parallel at any given radial position. Successive blades are of opposite hand i.e. the gap therebetween either increases or decreases in the axial direction of the coupling from one end towards the other to accommodate the intervening wedge-shaped sleeve 5.

As shown in FIG. 1 there are equal numbers of rubber elements 7 inclined at equal and opposite angles with respect to the rotational axis of the coupling with the rubber elements 7 disposed on either side of a sleeve 5 adopting a generally V-shaped configuration as viewed in the axial direction. Each pair of V-shaped elements is relatively divergent from one end of the coupling towards the other end and successive pairs are reversed.

Figures 8, 12:
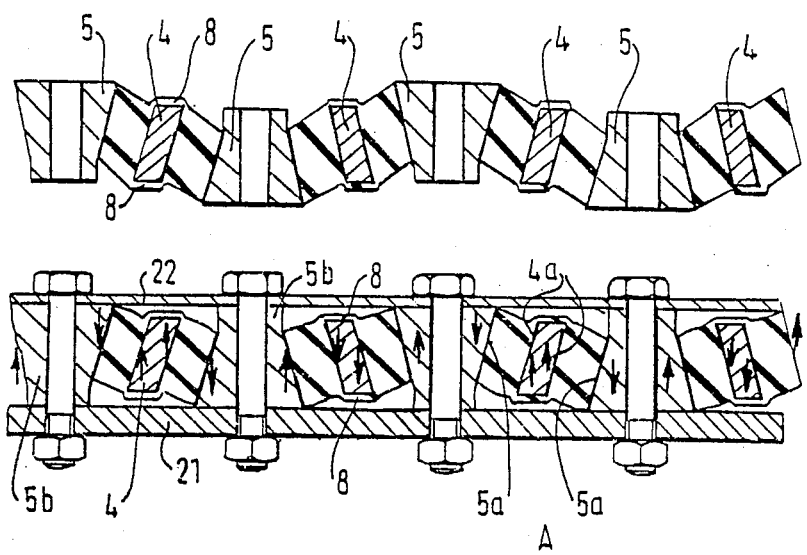
FIG. 8 is a development of a section through the coupling of FIGS. 1 to 7.
FIG. 12 is a development of a section through the assembled coupling of FIGS. 9 and 10.
Figure 9:
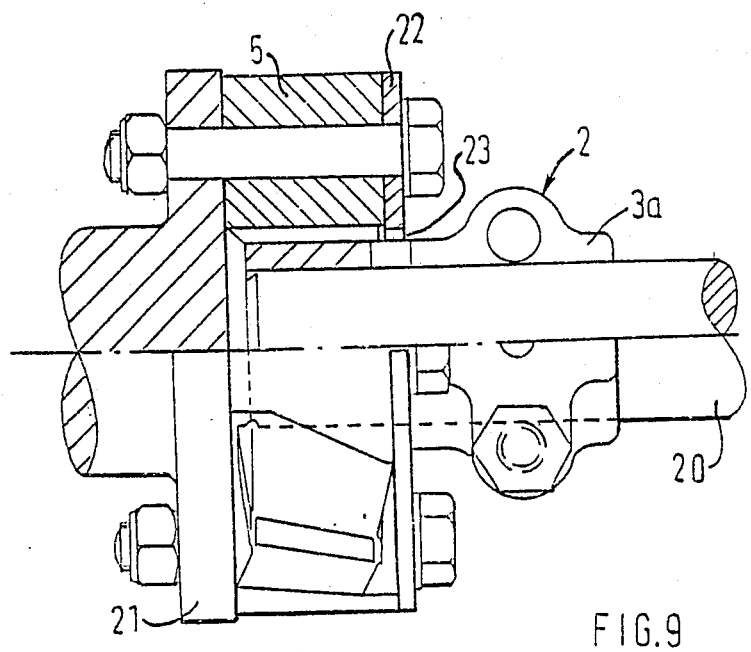
FIG. 9 is a side view, partly in section, of an installation incorporating the couplings shown in FIGS. 1 to 8.
Figure 10:
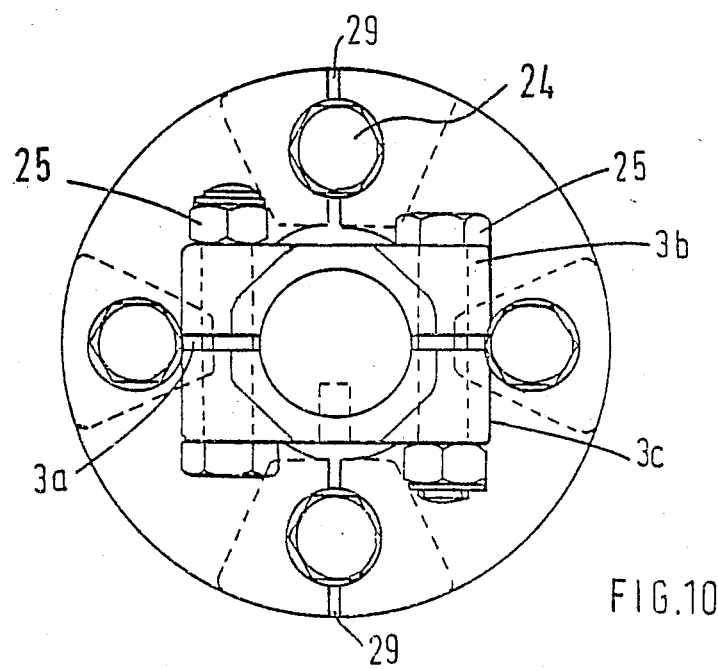
FIG. 10 is an end view of the installation shown in FIG. 9.

FIG. 8 shows the above-described coupling in the unloaded free condition in which successive sleeves 5 and intervening blade 4 are axially offset with one pair of opposed sleeves being axially offset to one side of the blade and the other pair of opposed sleeves being axially offset to the other side. In addition as shown the rubber elements 7 are moulded to extend over the end faces of the blades 4 to provide resilient stops 8.

Referring now to FIGS. 9 to 12 there is shown an installation in which the above-described coupling 1 is used to connect a boat propellor shaft 20 to a flexibly mounted engine (not shown).

The coupling 1 is positioned between an annular engine gear box flange 21 and an annular stop plate 22 having a split line 29 (see FIG. 10) to separate it into two halves for ease of assembly and a central aperture 23 through which the hub 3 of the spider 2 extends when assembled. The flange 21 and plate 22 are each formed with four apertures 21a and 22a respectively and each sleeve bore 6 is aligned with a pair of corresponding apertures 21a and 22a. On assembly each sleeve 5 is bolted to the flange 21 by a nut and bolt assembly 24. At the same time the stop plate 22 is drawn towards the flange 21 so as to reduce the axial offset between the sleeves 5 and blades 4 from that which exists in the unloaded free condition of the coupling (FIG. 8) and preload the rubber elements 7 in compression. As shown in FIG. 12 the reduction in axial offset is determined by the axial length of the sleeves 5 and in particular by the axial length of the integral spacer portions 5b thereof which may be selected to produce any desired degree of preloading.

An axially extending slot 3a divides the free end of the spider hub 3 into two halves 3c, 3b. On assembly the hub 3 is clamped to the shaft 20 by inserting the end of the shaft in the free end of the hub 3 and drawing the two hub halves together by means of a pair of nut and bolt assemblies 25.

In use axial loads in either direction are accommodated by the rubber elements 7 in compression and shear up to a predetermined value whereupon the blade end stops 8 contact either the stop plate 22 or gear box flange 21 to restrict further axial movement between the blades and sleeves thereby preventing over load of the elements 7. Torque loads in either direction are also accommodated by the rubber elements 7 in compression and shear but unlike the known couplings in which the load transmitting surfaces of the connector members are inclined relative to the rotational axis of the coupling the transmission of torque loads by the coupling according to the present invention is not accompanied by any tendency for the connector members connected to each of the components to move towards or away from one another in the axial direction. More particularly referring to FIG. 12, assume a torque load is applied to the coupling in the direction of the arrow A, an axial component of force will be generated at each of the load transmitting surfaces 4a and 5a of the blades 4 and sleeves 5 respectively which will act in the direction indicated from which it will be readily apparent that one pair of opposed blades has a net axial component of force in one direction which is equal and opposite to the net axial component of force of the other pair of opposed blades so that the resultant axial component of force acting on the spider under torque loads is zero. Likewise it will be noted that the axial component of force acting on the load transmitting surfaces of each sleeve are equal and opposite so that the resultant axial component of force acting on each sleeve under torque loads is also zero.

It will be understood the invention is not restricted to the above-described embodiment, for example the inclination of the load transmitting surfaces relative to the rotational axis of the coupling may be varied to provide any required axial and torque load capability. Each blade may have flat load transmitting surfaces which may be inclined at the same angle as the confronting load transmitting surface of the adjacent sleeve so as to be parallel thereto. Each sleeve may have curved load transmitting surfaces and may have a helical configuration similar to the load transmitting surface of the adjacent blade.

The number of blades and sleeves may be varied provided there is an even number of each, i.e. multiples of two of each and preferably a minimum of four of each.

Each sleeve may have an integral spacer portion as described or a separate spacer may be used on assembly the size of which may be selected to provide the required degree of pre-loading of the resilient elements. Alternatively pre-loading of the resilient elements may be effected by any other means known to those skilled in the art.

The spider may have a slotted hub as described to facilitate clamping of the hub to a shaft or the hub may be attached by any other suitable means e.g. radially extending bolts.

The resilient elements may be made of any suitable elastomer and may include a reinforcement.

Having described my invention, what I claim is:

1. A flexible coupling for two components comprising at least two pairs of connector members for each component to be coupled and a plurality of elastomeric elements arranged alternately to form a ring in which alternate connector members are adapted for connection to a respective one of two components to be connected and each connector member has a pair of load transmitting surfaces which at least when the coupling is in an unstressed condition extend at an angle to the rotational axis of the coupling wherein there is an even number of connector members for attachment to each component and respective load transmitting surfaces of the successive connector members for attachment to a respective one component are angled alternately to face toward opposite ends of the coupling and are reversed in orientation of their angle to the rotational axis such that in use of the coupling to transmit torque, the induced axial component of force acting on half of the connector members for attachment to said one component substantially equals and opposes the induced axial conponent of force acting on the remainder of the connector members for attachment to said one component.

2. A coupling according to claim 1 comprising eight connector members of which four are adapted for connection to said one component and the remaining four are adapted for connection to the other component.

3. A coupling according to claim 1 wherein each of the connector members adapted for connection to said one component has load transmitting surfaces oppositely inclined relative to the axis of rotation of the coupling.

4. A coupling according to claim 3 wherein said surfaces are inclined at equal and opposite angles.

5. A coupling according to claim 3 wherein each of the connector members adapted for connection to the other component has load transmitting surfaces inclined at equal angles to the axis of rotation of the coupling.

6. A coupling according to claim 5 wherein said connector members adapted for connection to said other component each comprise a radially extending blade.

7. A coupling according to claim 6 wherein said blades form part of a spider having a central hub for attachment to said other component.

8. A coupling according to claim 6 wherein each blade is of helical configuration.

9. A coupling according to claim 1 wherein said elastomeric elements are pre-loaded in compression.

10. A coupling according to claim 1 wherein successive connector members adapted for connection to said one component are axially offset to either side of a common plane transverse to the axis of rotation of the coupling and the connector members adapted for connection to the other component lie in said common plane.

11. A coupling according to claim 10 wherein each axially offset connector member has an integral axially extending spacer portion.

* * * * *